(12) United States Patent
Aust et al.

(10) Patent No.: US 12,358,542 B2
(45) Date of Patent: **\*Jul. 15, 2025**

(54) COMPUTING SYSTEM AND METHOD FOR OPERATING A COMPUTING SYSTEM

(71) Applicant: Siemens Mobility GmbH, Munich (DE)

(72) Inventors: Frank Aust, Salzgitter (DE); Matthias Seifert, Buchholz (DE)

(73) Assignee: Siemens Mobility GmbH, Munich (DE)

( * ) Notice: Subject to any disclaimer, the term of this patent is extended or adjusted under 35 U.S.C. 154(b) by 883 days.

This patent is subject to a terminal disclaimer.

(21) Appl. No.: 17/619,003

(22) PCT Filed: May 12, 2020

(86) PCT No.: PCT/EP2020/063128
§ 371 (c)(1),
(2) Date: Dec. 14, 2021

(87) PCT Pub. No.: WO2020/249342
PCT Pub. Date: Dec. 17, 2020

(65) Prior Publication Data
US 2022/0348239 A1    Nov. 3, 2022

(30) Foreign Application Priority Data

Jun. 14, 2019    (DE) .................. 10 2019 208 710.8

(51) Int. Cl.
*B61L 15/00*    (2006.01)
*H04L 9/40*    (2022.01)

(52) U.S. Cl.
CPC ........ *B61L 15/0018* (2013.01); *H04L 63/062* (2013.01); *H04L 63/08* (2013.01)

(58) Field of Classification Search
CPC ..... H04L 63/062; H04L 63/08; B61L 15/0018
(Continued)

(56) References Cited

U.S. PATENT DOCUMENTS 9,749,011 B2 *    8/2017    Kim .................... H04L 63/1425
10,833,965 B2 *    11/2020    Blöcher ................. H04L 43/08
(Continued)

FOREIGN PATENT DOCUMENTS

CN    103930297 A    7/2014
CN    107645310 A    1/2018
(Continued)

OTHER PUBLICATIONS

Rautmare Suhas: "SCADA System Security—Challenges and Recommendations", 2011 Annual IEEE India Conference, published Jan. 26, 2012.

*Primary Examiner* — Christopher M Crutchfield
*Assistant Examiner* — Jean F Voltaire
(74) *Attorney, Agent, or Firm* — Laurence A. Greenberg; Werner H. Stemer; Ralph E. Locher

(57) ABSTRACT

A computing system has with a computing device. The computing system has an input data path, which unidirectionally connects an interface device of the computing system to the computing device, and an output data diode, which unidirectionally connects the computing device to at least one output interface of the computing system. The input data path has a series circuit which is arranged downstream of the interface device and contains an input data diode and a data lock. The input data diode allows a transmission of data in the direction of the computing device and prevents the transmission of data in the opposite direction. The data lock has a first and a second terminal and a temporary storage unit for temporarily storing data and is configured such that the temporary storage unit can be (Continued)

selectively connected solely to the first or second terminal but not simultaneously to both terminals.

17 Claims, 6 Drawing Sheets

(58) Field of Classification Search
USPC .......................................................... 709/200
See application file for complete search history.

(56) References Cited

U.S. PATENT DOCUMENTS

| | | | |
|---|---|---|---|
| 11,368,437 B2* | 6/2022 | Wimmer | H04L 63/166 |
| 11,611,409 B2* | 3/2023 | Chan | H04L 63/0227 |
| 2002/0026446 A1 | 2/2002 | Groos, III et al. | |
| 2004/0054792 A1 | 3/2004 | Pitsos | |
| 2005/0154823 A1 | 7/2005 | Bruner et al. | |
| 2012/0260088 A1 | 10/2012 | Fries et al. | |
| 2012/0309455 A1 | 12/2012 | Klose et al. | |
| 2013/0114614 A1 | 5/2013 | Tran et al. | |
| 2014/0237372 A1* | 8/2014 | Mraz | H04L 67/125 |
| | | | 715/734 |
| 2014/0361608 A1 | 12/2014 | Wang | |
| 2015/0188985 A1* | 7/2015 | Marty | H04L 67/06 |
| | | | 709/218 |
| 2018/0115528 A1* | 4/2018 | Rotvold | H04L 9/0827 |
| 2018/0124121 A1* | 5/2018 | Blöcher | H04W 12/02 |
| 2019/0265667 A1 | 8/2019 | Yi et al. | |
| 2019/0303306 A1* | 10/2019 | Ren | G06F 13/102 |
| 2020/0120071 A1* | 4/2020 | Wimmer | H04L 63/0209 |
| 2021/0286906 A1* | 9/2021 | Fries | G06F 21/79 |

FOREIGN PATENT DOCUMENTS

| | | |
|---|---|---|
| CN | 109565502 A | 4/2019 |
| EP | 3483769 A1 | 5/2019 |
| RU | 2289886 C2 | 12/2006 |
| RU | 2554532 C2 | 6/2015 |
| WO | 9946882 A2 | 9/1999 |

* cited by examiner

COMPUTING SYSTEM AND METHOD FOR OPERATING A COMPUTING SYSTEM

FIELD AND BACKGROUND OF THE INVENTION

The invention relates to computing systems and to methods for operating computing systems.

SUMMARY OF THE INVENTION

There is increasingly a need for remote maintenance ("remote access" in technical terminology) for security-critical computing systems. However, in particular applications, the system elements to be maintained are in a special security zone, to which no direct remote access is possible.

There is also an increasing need for the networking of security-relevant systems to conventional IT systems. In the case of such networking, it should be ensured that only permissible information elements are transmitted via the connection of these data networks. The data networks should be disconnected from one another for all other and therefore non-permissible information.

As is known, the data networks can be connected bidirectionally, for example using routers or gateways which have firewalls. However, critical networks with a very high need for protection are nowadays generally completely disconnected from other networks—such as the office network or the Internet.

In order to channel diagnostic data, for example, from a security-critical network in order for said data to be able to be analyzed by an expert at a remote location, data diodes which do not compromise the protection of the critical network are used nowadays.

A previously unsolved problem is now that of how data can also be transported in the other direction, that is to say from the non-secure network (for example open network) to the security-critical network (closed network), with a similarly high security requirement. These data are needed, for example, to change existing configurations or to install updates in the components present there.

The invention is based on the object of further developing computing systems and methods for operating the latter with a view to secure reception of data from the outside.

This object is achieved, according to the invention, by means of a computing system having the features as claimed in the independent computing system patent claim. Advantageous configurations of the computing system according to the invention are specified in subclaims.

Accordingly, the invention provides for the computing system to have an input data path, which unidirectionally connects an interface device of the computing system to the computing device, and an output data diode, which unidirectionally connects the computing device to at least one output interface of the computing system, for the input data path to have a series circuit which is arranged downstream of the interface device and comprises an input data diode and a data lock, for the input data diode to allow data to be transmitted in the direction of the computing device and to prevent this in the opposite direction, and for the data lock to have a first and a second connection and a buffer for buffering data and to be configured such that the buffer can either be exclusively connected to the first or second connection, but not to both connections at the same time.

An important advantage of the computing system according to the invention can be seen in the fact that a disconnection between the computing device and external data transmitting devices is continuously ensured by the combination according to the invention of the input data diode and the data lock, with the result that said data transmitting devices cannot exert a direct influence on the computing device at any time. All data which are transmitted by an external data transmitting device in the direction of the computing device are initially buffered at least in the data lock, with the result that a direct attack is not possible.

The data lock may be arranged upstream of the data input diode and may be connected, by way of its first connection, to the interface device and, by way of its second connection, to the input data diode. However, it is considered to be particularly advantageous if the data lock is arranged downstream of the input data diode and is connected, by way of its first connection, to the input data diode and, by way of its second connection, to the computing device.

It is considered to be advantageous if the interface device is suitable for receiving a request message which indicates the desire of an external data transmitting device to transmit data to the computing device, at least one auxiliary computing device is present and is configured in such a manner that it allows external data to be received at predefined times or in predefined time slots and prevents this outside the predefined times or time slots, and the output data diode connects the computing device to the at least one auxiliary computing device and allows data to be transmitted in the direction of the auxiliary computing device and prevents this in the opposite direction.

The interface device is preferably configured in such a manner that, after receiving the request message, it creates a modified request message containing the request and forwards it to the input data diode, wherein the modified request message contains identification data relating to the interface device.

It is also advantageous if the interface device is configured in such a manner that, after receiving the request message, it carries out a check in order to determine whether the request message comes from an external data transmitting device which is authorized to transmit data, and, in the event of a request message from an authorized data transmitting device, it transmits the request message or the modified request message to the input data diode and otherwise does not do so.

After receiving the request message, the interface device preferably carries out a check in order to determine whether the request message contains control commands or executable software modules, and, if this is the case, it preferably does not forward the request message to the input data diode.

After receiving the request message or modified request message which has been forwarded via the input data diode and the data lock, the computing device preferably generates a response message and transmits it to the external data transmitting device via the output data diode, wherein the response message indicates at least one future time or time slot at which or in which data can be transmitted to the auxiliary computing device.

The response message preferably contains a public key of the computing device and/or an address, in particular an IP address, of the auxiliary computing device.

The computing device is preferably configured in such a manner that, after receiving the data from the data transmitting device, it creates a signature data record using said data and transmits it to the external data transmitting device via the output data diode.

A further data memory is preferably present in the input data diode or between the input data diode and the data lock. The request message and/or data from the external data transmitting device is/are preferably buffered in the further data memory and are only then transmitted, in a manner divided into data packets, to the computing device data packet by data packet via the data lock.

The auxiliary computing device is preferably configured in such a manner that, while receiving or after receiving data from an external data transmitting device, it checks whether this device is an authorized data transmitting device and/or whether a response message has previously been transmitted to it by the computing device, in the event of a negative checking result, it does not forward the data to the computing device, and, in the event of a positive checking result, it forwards the received data to the computing device via the input data diode and the data lock.

The interface device and/or the output interface is/are preferably formed by the auxiliary computing device.

The invention also relates to a railway system, in particular a signal tower or a rail vehicle. According to the invention, the railway system has a computing system as described above.

The invention also relates to a method for operating a computing system, in particular a computing system as described above. The invention provides for data to be transmitted to the computing device via an input data path, wherein the input data path has a series circuit which is arranged downstream of an interface device and comprises an input data diode and a data lock, wherein the input data diode allows data to be transmitted in the direction of the computing device and prevents this in the opposite direction, and wherein the data lock has a first and a second connection and a buffer for buffering data, and the buffer is either exclusively connected to the first or the second connection, but not to both connections at the same time.

With respect to the advantages of the method according to the invention and with respect to advantageous configurations of the method according to the invention, reference is made to the above statements in connection with the computing system according to the invention.

It is advantageous if, after receiving a request message, a response message, which defines at least one future time or time slot, is generated using the computing device and the response message is transmitted to the data transmitting device via an output data diode, data are allowed to be received from the external data transmitting device at the time or in the time slot indicated in the response message using an auxiliary computing device and the data from the external data transmitting device are received, and the received data are transmitted to the computing device via the input data path.

It is also advantageous if, after receiving the data from the data transmitting device, the computing device creates a signature data record using the data and transmits it to the external data transmitting device via the output data diode, and the computing device only uses or considers the received data if the data transmitting device, after receiving the signature data record, reports back that the signature data record confirms correct data reception.

It is also considered to be advantageous if
  after receiving the request message, a modified request message containing the request is created using the interface device and is forwarded to the input data diode, wherein the modified request message contains identification data relating to the interface device, and/or
  after receiving the request message, a check is carried out in order to determine whether the request message comes from an external data transmitting device which is authorized to transmit data, the request message or the modified request message is transmitted to the input data diode in the event of a request message from an authorized data transmitting device and this is otherwise not carried out, and/or
  after receiving the request message, a check is carried out in order to determine whether the request message contains control commands or executable software modules, and, if this is the case, the request message is not forwarded to the input data diode, and/or
  after receiving the request message or modified request message which has been forwarded via the input data diode and the data lock, the computing device generates a response message and transmits it to the external data transmitting device via the output data diode, wherein the response message directly or indirectly indicates at least one future time or time slot at which or in which data can be transmitted to the auxiliary computing device, and/or
  the response message contains a public key of the computing device and/or an address of the auxiliary computing device, and/or
  after receiving the data from the data transmitting device, the computing device creates a signature data record using said data and transmits the signature data record to the external data transmitting device via the output data diode, and/or
  the request message and/or the data from the external data transmitting device is/are buffered in a buffer in the input data diode or using a buffer between the input data diode and the data lock and are only then transmitted, in a manner divided into data packets, to the computing device data packet by data packet via the data lock, and/or
  the auxiliary computing device makes it possible to receive data at predefined times or in predefined time slots and forwards received data to the computing device via the input data diode and the data lock, and/or
  upon receiving data from an external data transmitting device, the auxiliary computing device checks whether this device is an authorized data transmitting device and/or whether a response message has been previously transmitted to this device, does not forward the data to the computing device in the event of a negative checking result and forwards the received data to the computing device via the input data diode and the data lock in the event of a positive checking result, and/or
  at least one media change, in particular at least one physical media change, a protocol change and/or a transport media change, is carried out in the input data path, and/or
  sequences are counted and/or signatures are transmitted in order to detect errors in the transmission of data.

The invention is explained in more detail below on the basis of exemplary embodiments; in the drawings, and by way of example.

DETAILED DESCRIPTION OF THE INVENTION

In the figures, the same reference signs are always used for identical or comparable components for the sake of clarity.

Figure 1:
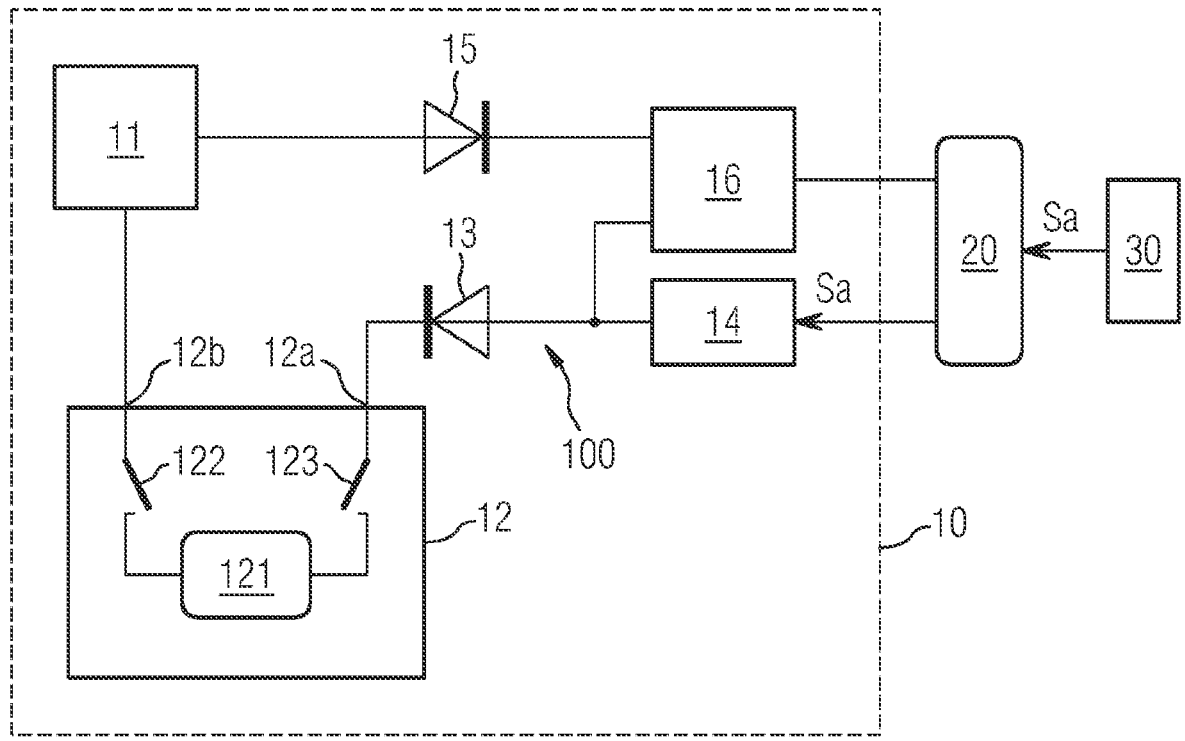
FIG. 1 shows an exemplary embodiment of a computing system according to the invention, to which a request message is transmitted by an external data transmitting device.

FIG. 1 shows a computing system 10 having a computing device 11. The computing device 11 is connected to a communication network 20, which is only indicated, via a data lock 12, an input data diode 13 and an interface device 14. The computing system 10 can receive request messages Sa from an external data transmitting device 30 via the communication network 20. The communication network 20 may be the Internet, for example.

The data lock 12 has a first connection 12a which is connected to the input data diode 13. A second connection 12b of the data lock 12 is connected to the computing device 11. The data lock 12 comprises a buffer 121 which makes it possible to buffer data. The buffer 121 is connected to the second connection 12b via a first switch 122 and is connected to the first connection 12a via a second switch 123. The two switches 122 and 123 may be switched off at the same time, but never switched on at the same time. The buffer 121 can therefore be either isolated or connected to a single one of the two connections 12a and 12b. The switches 122 and 123 can be controlled by an internal control unit of the data lock 12 or from the outside, for example by the computing device 11.

In the exemplary embodiment according to FIG. 1, the data lock 12, the input data diode 13 and the interface device 14 form an input data path 100 of the computing system 10, which input data path makes it possible to unidirectionally transmit data from the interface device 14 in the direction of the computing device 11 in a non-transparent manner. In order to achieve the non-transparency, the data lock 12 is provided, the first connection 12a of which can be connected to the input data diode 13 in order to receive data from the input data diode 13; at this time, the second connection 12b of the data lock 12 is disconnected from the computing device 11, with the result that no immediate or direct data flow from the input data diode 13 in the direction of the computing device 11 is possible. Data which are fed into the data lock 12 from the input data diode 13 via the first connection 12a are initially buffered in the buffer 121. After buffering, the data lock 12 can be switched over, wherein the first connection 12a is disconnected from the input data diode 13 and the second connection 12b of the data lock 12 is only then connected to the computing device 11. In other words, the data lock 12 is configured in such a manner that its two connections 12a and 12b are always exclusively connected either to the input data diode 13 or to the computing device 11, but never to both connections of both units at the same time.

On the output side, the computing device 11 can be connected, via a unidirectionally operating output data diode 15, to the communication network 20 and the external data transmitting device 30, whether directly or indirectly, for example via an auxiliary computing device, also called auxiliary device 16 for short below, of the computing system 10, the interface device 14 or another component of the computing system 10 which is not described any further.

The computing system 10 according to FIG. 1 can be operated as follows, for example:

If the external data transmitting device 30 transmits a request message Sa to the interface device 14, which request message is used by the external data transmitting device 30 to indicate the desire to transmit data in the direction of the computing device 11, the interface device 14 will process the request message Sa. The interface device 14 can check, for example, whether the request message has been transmitted from a known source or in a sufficiently signed form and/or is free of control commands or control programs.

Figure 2:
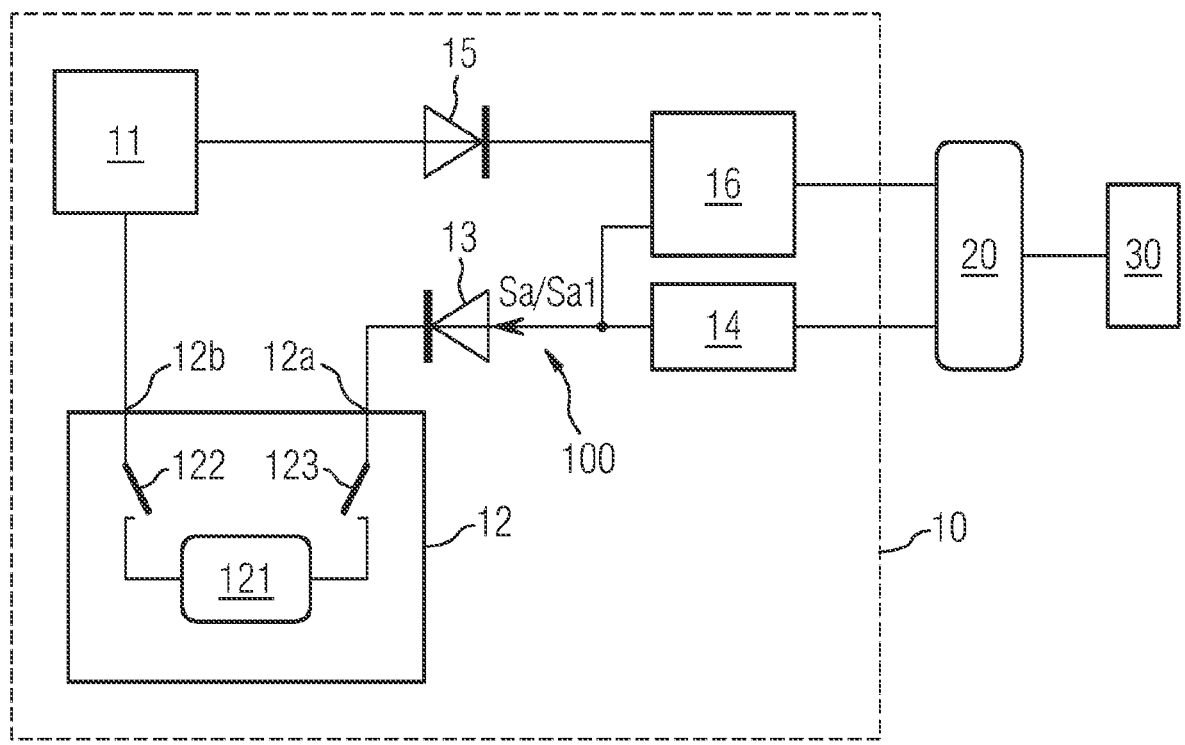
FIGS. 2-10 show further illustrations of the computing system according to FIG. 1 during and after the processing of the request message.

If the interface device 14 determines during its check that the request message Sa is not critical, it can transmit this message in unchanged form or in modified form as a modified request message Sa1 in the direction of the computing device 11 via the unidirectional input data path 100. FIG. 2 shows the forwarding of the modified request message Sa1.

Figure 3:
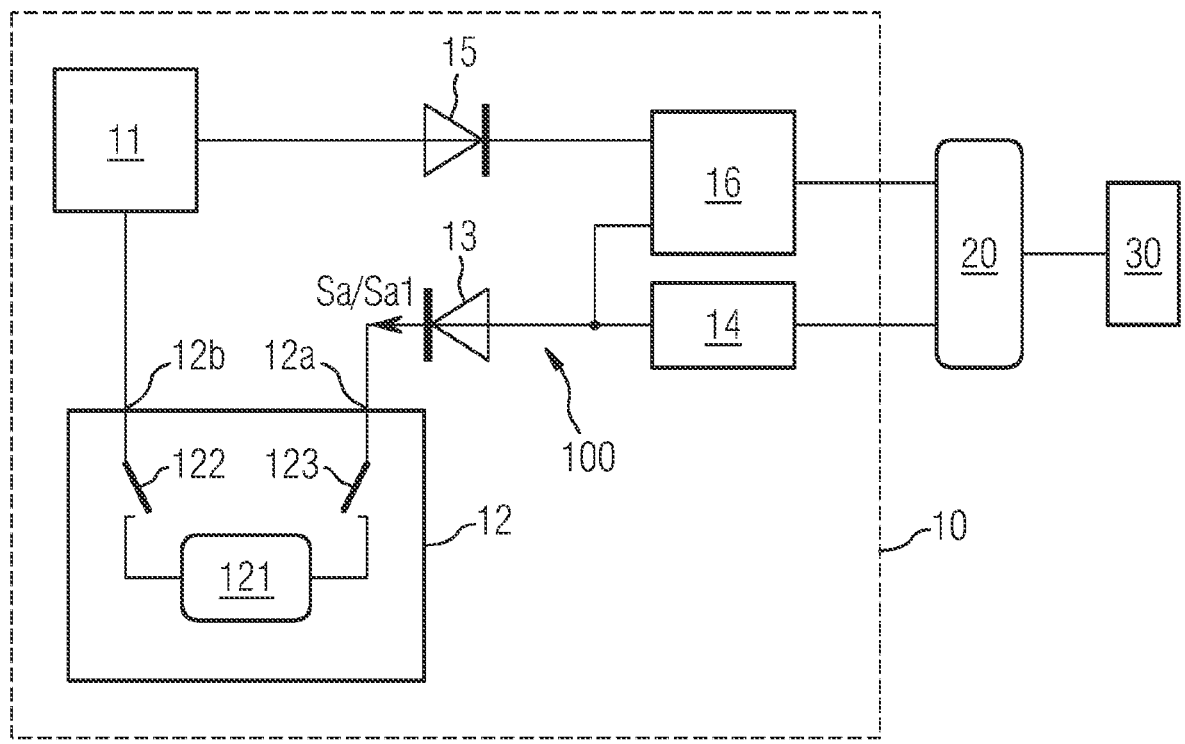

FIG. 3 shows how the request message Sa or the modified request message Sa1 passes, via the unidirectional input data path 100, to the input data diode 13 and, from the latter, to the first connection 12a of the data lock 12.

If the data lock 12 or its buffer 121 is connected to the input data diode 13 via the first connection 12a, the request message Sa or the modified request message Sa1 can be stored in the buffer 121.

Figure 4:
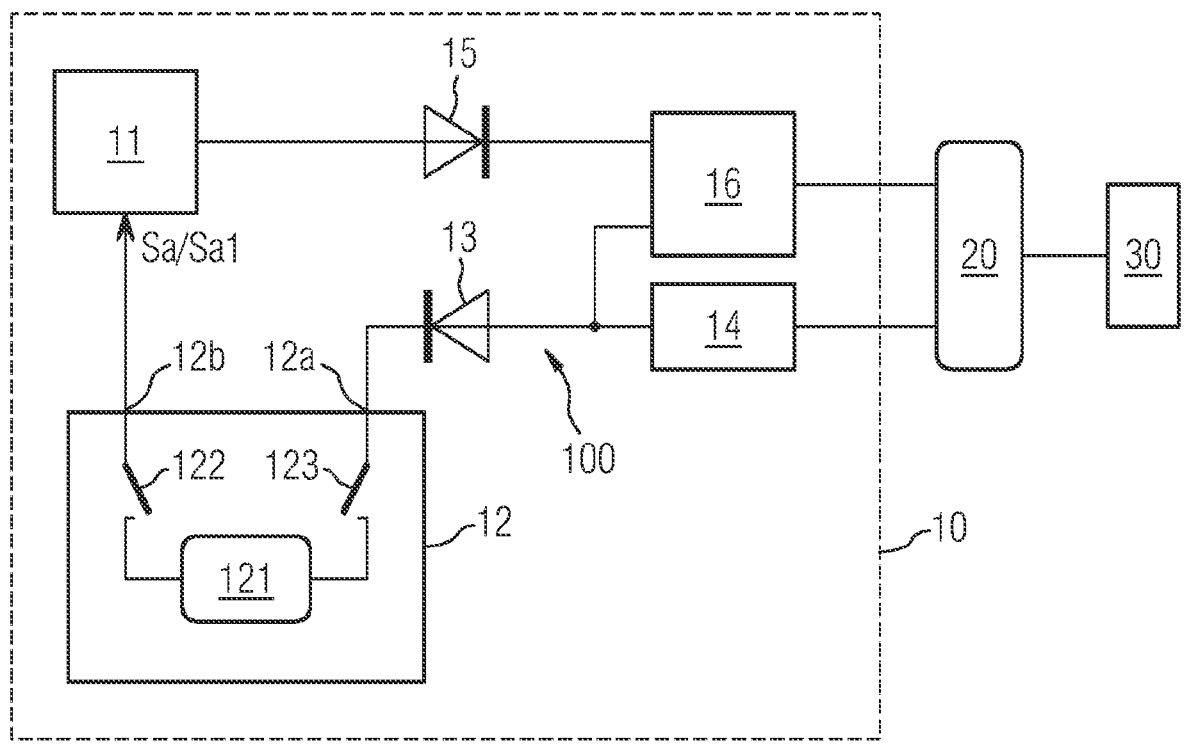

As soon as the first connection 12a of the data lock 12 has been disconnected from the input data diode 13, the second connection 12b of the data lock 12 can be connected to the computing device 11 and the request message Sa or the modified request message Sa1 stored in the buffer 121 can be transmitted to computing device 11 (see FIG. 4).

As soon as the computing device 11 has received the request message Sa or the modified request message Sa1, it can process said message and decide whether it wants to or can receive data from the external data transmitting device 30.

It is assumed by way of example below that the request message Sa or the modified request message Sa1 signals to the computing device 11 that update messages or update software is/are intended to be transmitted by the external data transmitting device and that such transmission is also permissible.

Figure 5:
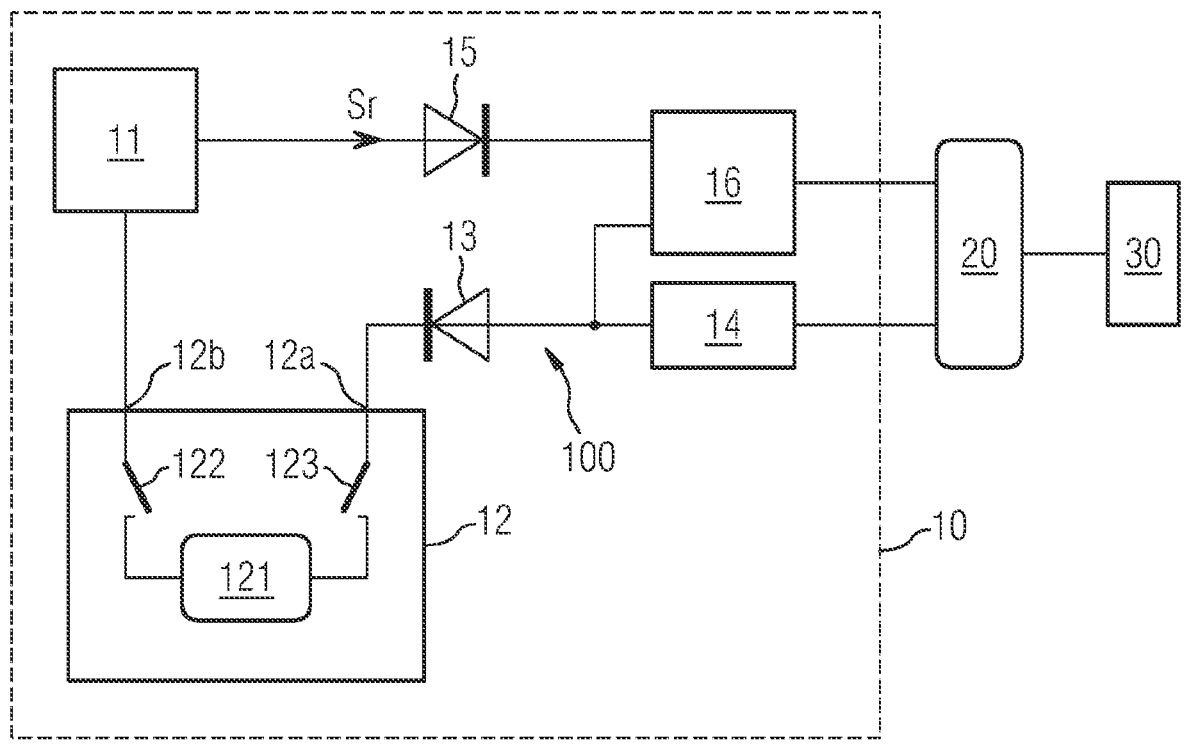

In the last-mentioned case, the computing device 11 will transmit a response message Sr to the communication network 20 and therefore to the external data transmitting device 30 via the output data diode 15, as shown by way of example in FIG. 5. The response message Sr can be transmitted directly from the output data diode 15 to the external data transmitting device 30 via the communication network 20 or instead indirectly via the auxiliary device 16 or the interface device 14.

The response message Sr preferably contains details of a predefined time or time slot at which or in which the auxiliary device 16 of the computing system 10 is available to receive further data from the external data transmitting device 30 and will make it possible to receive further data.

Figure 6:
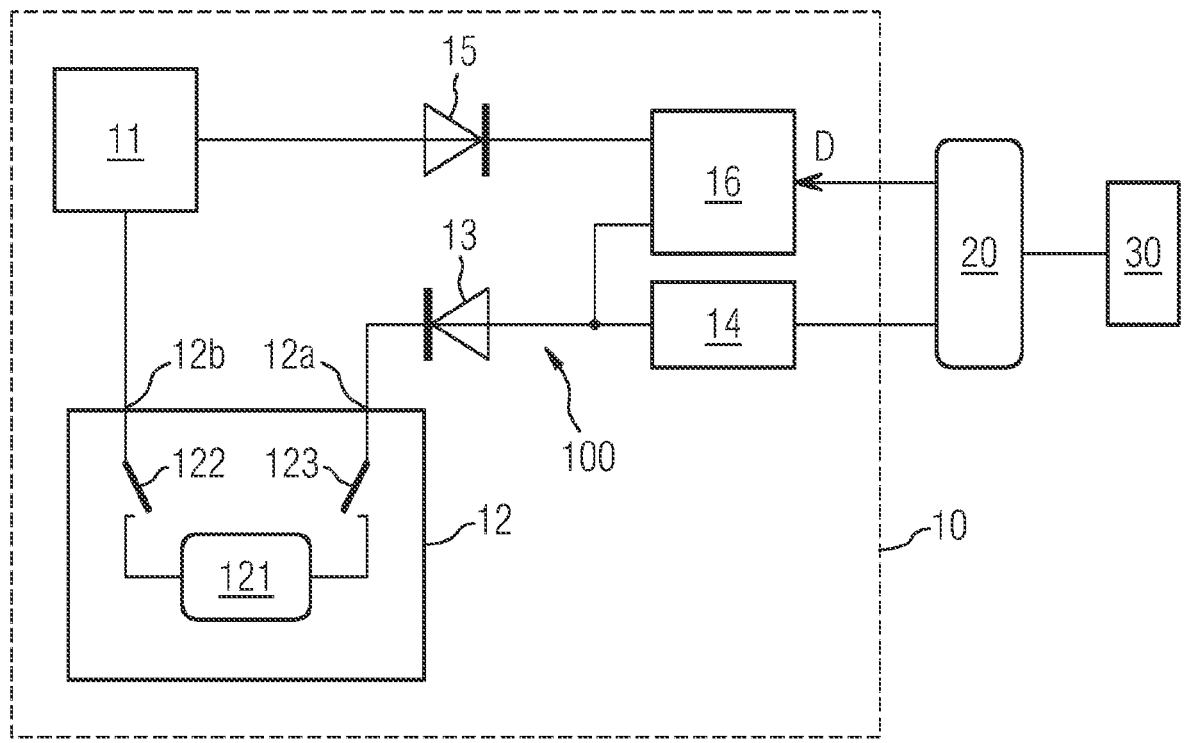

As soon as the external data transmitting device 30 has received the response message Sr from the computing device 11, it can transmit its data D, for example update data, to the auxiliary device 16 while complying with the predefined times or time slots which have been predefined by the computing device 11 (see FIG. 6).

Figure 7:
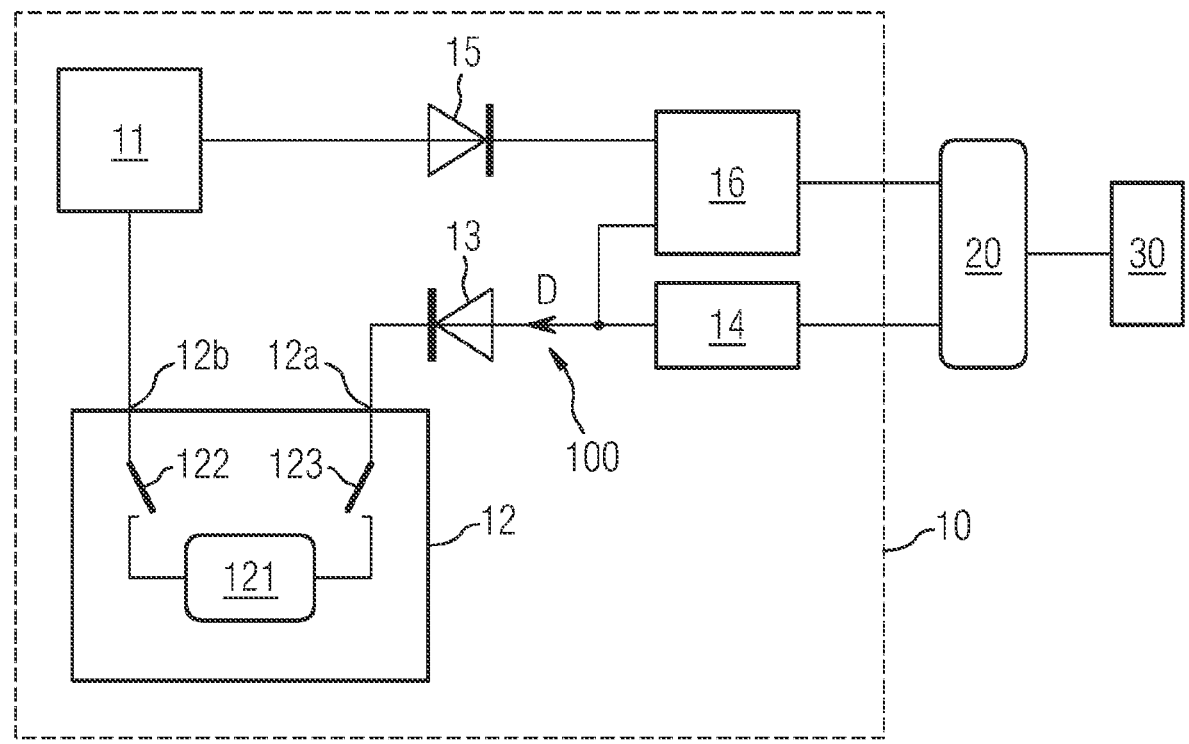

The auxiliary device 16 will expect the data at the predefined times or in the predefined time slots and will transmit said data to the computing device 11 via the input data path 100 (see FIG. 7). The auxiliary device 16 receives the information relating to the predefined times or time slots at which or in which it is intended to make it possible to receive data, for example by means of the response message Sr, provided that the latter is fed into the communication network 20 via the auxiliary device 16; otherwise, it is informed separately by the computing device 11.

The data D transmitted from the external data transmitting device 30 via the auxiliary device 16 at the predefined times or in the predefined time slots are transmitted via the input data path 100 and therefore via the data lock 12, with the result that direct access of the external data transmitting device 30 or of the auxiliary device 16 to the computing device 11 is again not transparently possible at any time.

Figure 8:
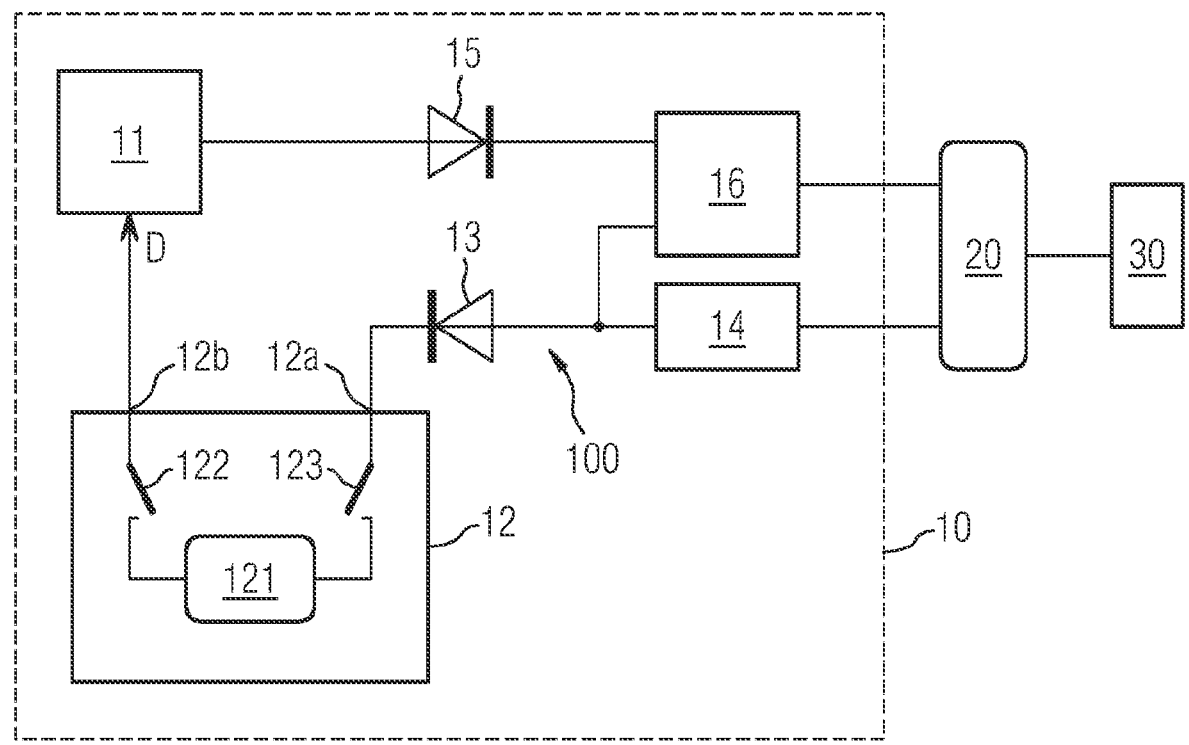

After the data D from the external data transmitting device 30 have been transmitted—preferably data packet by data packet—to the computing device 11 via the auxiliary device 16 and the data lock 12 (see FIG. 8), the computing device 11 can check whether the received data packets or the received data D have been transmitted and received without damage or without change overall; such a check can be carried out, for example, on the basis of checksums, hash codes or the like.

Figure 9:
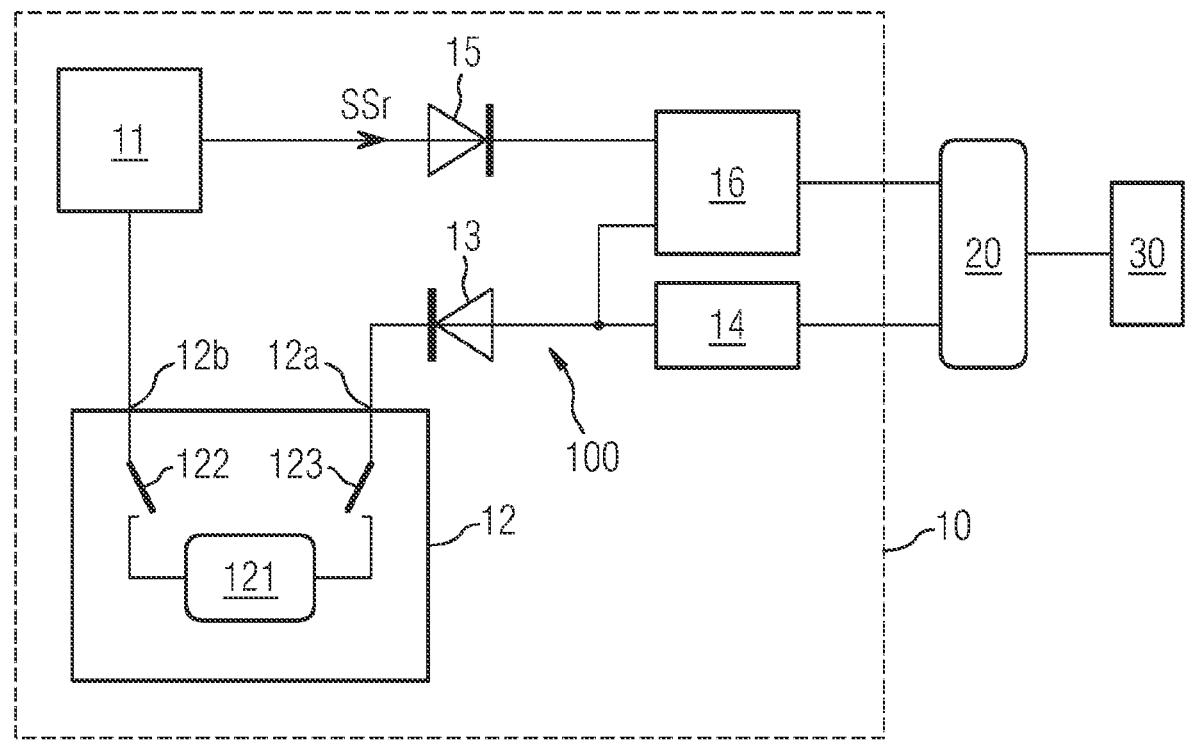

If the computing device 11 comes to the conclusion that the received data from the external data transmitting device 30 have been correctly received, it can generate a signature data record SSr and can transmit it to the external data transmitting device 30 via the output data diode 15 and the communication network 20. The transmission may incorporate the auxiliary device 16 and/or the interface device 14 or another component not shown in FIG. 1 (see FIG. 9).

Figure 10:
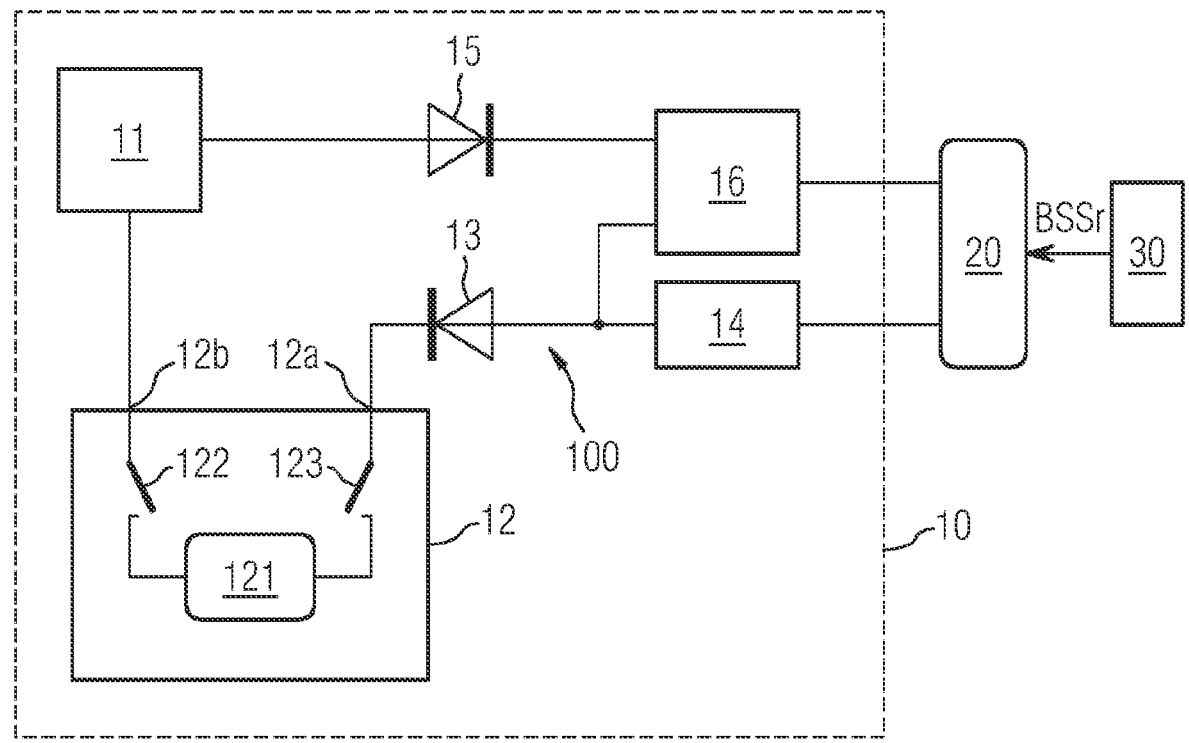

The external data transmitting device 30 now has the opportunity to in turn check, on the basis of the received signature data record SSr, whether the data D received by the computing device 11 are correct or have been correctly received by the latter. If it determines, on the basis of the signature data record SSr, that data have been correctly received by the computing device 11 via the input data path 100, the external data transmitting device transmits, on the output side, a confirmation signal BSSr to the computing device 11 via the interface device 14 and the input data path 100, that is to say with the inclusion of the data lock 12 (see FIG. 10).

Only after the computing device 11 has received this confirmation signal BSSr from the external data transmitting device 30 does it assume that data have been correctly received via the input data path 100 and the data D can be used.

Figure 11:
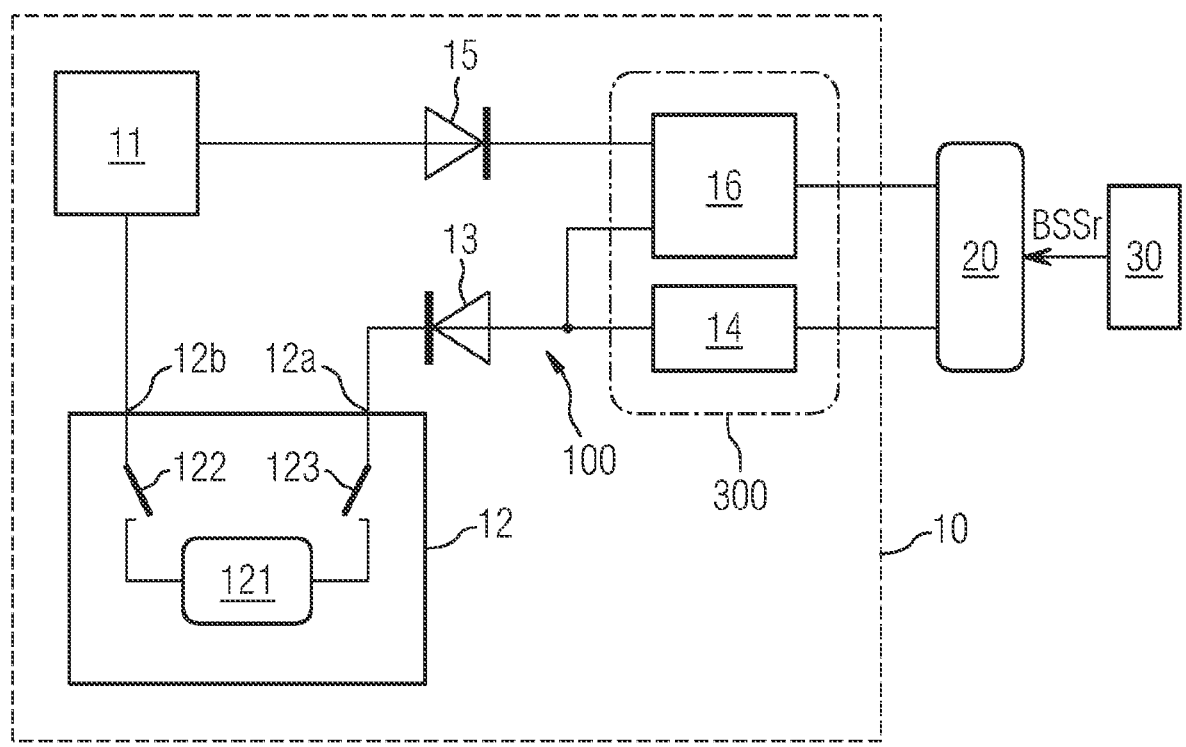
FIG. 11 shows a further exemplary embodiment of a computing system according to the invention.

In the illustration according to FIGS. 1 to 10, it is assumed, by way of example, that the auxiliary device 16 is a component which is disconnected or separate from the interface device 14. Alternatively, provision may be made for the auxiliary device 16 and the interface device 14 to be integrated inside a common computing device which is indicated with the reference sign 300, by way of example, in FIG. 11.

In addition, provision may be alternatively made for the auxiliary device 16 to be integrated in the interface device 14 or for the interface device 14 to be integrated in the auxiliary device 16.

Although the invention has been described and illustrated more specifically in detail by means of preferred exemplary embodiments, the invention is not restricted by the disclosed examples and other variations can be derived therefrom by a person skilled in the art without departing from the scope of protection of the invention.

The invention claimed is:

1. A computing system, comprising:
   a computing device;
   an interface;
   an input data path unidirectionally connecting said interface to said computing device;
   at least one output interface;
   an output data diode unidirectionally connecting said computing device to said at least one output interface; and
   said input data path containing a series circuit disposed downstream of said interface and having an input data diode and a data lock, said input data diode allowing data to be transmitted in a direction of said computing device and preventing this in an opposite direction, and said data lock having a first connection, a second connection and a buffer for buffering the data, said data lock configured such that said buffer can either be exclusively connected to said first connection or said second connection, but not to both said first and second connections at a same time.

2. The computing system according to claim 1,
   wherein said interface is suitable for receiving a request message which indicates a desire of an external data transmitting device to transmit data to said computing device;
   further comprising at least one auxiliary computing device configured in such a manner that it allows external data to be received at predefined times or in predefined time slots and prevents this outside the predefined times or the predefined time slots; and
   wherein said output data diode connects said computing device to said at least one auxiliary computing device and allows data to be transmitted in a direction of said at least one auxiliary computing device and prevents this in an opposite direction.

3. The computing system according to claim 2, wherein said interface is configured in such a manner that, after receiving the request message, said interface creates a modified request message containing a request and forwards it to said input data diode, wherein the modified request message contains identification data relating to said interface.

4. The computing system according to claim 3, wherein said interface is configured in such a manner that:
   after receiving the request message, it carries out a check in order to determine whether the request message comes from the external data transmitting device which is authorized to transmit the data; and
   in an event of the request message being from an authorized data transmitting device, said interface transmits the request message or the modified request message to said input data diode and otherwise does not do so.

5. The computing system according to claim 2, wherein said interface is configured in such a manner that:
   after receiving the request message, it carries out a check in order to determine whether the request message contains control commands or executable software modules; and
   if this is the case, said interface does not forward the request message to said input data diode.

6. The computing system according to claim 3, wherein:
   said computing device is configured in such a manner that, after receiving the request message or the modified request message which has been forwarded via said input data diode and said data lock, said computing device generates a response message and transmits it to the external data transmitting device via said output data diode; and
   the response message indicates at least one future time or time slot at which or in which the data can be transmitted to said at least one auxiliary computing device.

7. The computing system according to claim 2, wherein the response message contains a public key of said computing device and/or an address of said at least one auxiliary computing device.

8. The computing system according to claim 2, wherein said computing device is configured in such a manner that, after receiving the data from the data transmitting device, it creates a signature data record using the data and transmits the signature data record to the external data transmitting device via said output data diode.

9. The computing system according to claim 2, further comprising a further data memory disposed in said input data diode or between said input data diode and said data lock, the request message and/or the data from the external data transmitting device is/are buffered in said further data memory and are only then transmitted, in a manner divided into data packets, to said computing device data packet by data packet via said data lock.

10. The computing system according to claim 2, wherein said at least one auxiliary computing device is configured in such a manner that:
   while receiving or after receiving the data from the external data transmitting device, said at least one auxiliary computing device checks whether the external data transmitting device is an authorized data transmitting device and/or whether the response message has previously been transmitted to it by said computing device;
   in an event of a negative checking result, said at least one auxiliary computing device does not forward the data to said computing device, and
   in an event of a positive checking result, said at least one auxiliary computing device forwards the data received to said computing device via said input data diode and said data lock.

11. The computing system according to claim 2, wherein said interface and/or said at least one output interface is/are formed by said at least one auxiliary computing device.

12. The computing system according to claim 7, wherein the address is an Internet protocol address.

13. A railway system, comprising:
   said computing system according to claim 1.

14. The railway system according to claim 13, wherein the railway system is a signal tower.

15. A method for operating a computing system, which comprises the steps of:
   transmitting data to a computing device via an input data path, wherein the input data path having a series circuit being disposed downstream of an interface and containing an input data diode and a data lock, wherein the input data diode allowing the data to be transmitted in a direction of the computing device and prevents data transmission in an opposite direction, and wherein the data lock having a first connection, a second connection and a buffer for buffering the data, and the buffer is either exclusively connected to the first connection or the second connection, but not to both the first and second connections at a same time.

16. The method according to claim 15, which further comprises:
   generating, after receiving a request message, a response message, which defines at least one future time or time slot, using the computing device and the response message is transmitted to the data transmitting device via an output data diode;
   receiving the data allowed to be received from an external data transmitting device at the future time or in the time slot indicated in the response message using an auxiliary computing device and receiving the data from the external data transmitting device; and
   transmitting the data received to the computing device via the input data path.

17. The method according to claim 16, which further comprises:
   creating, after receiving the data from the external data transmitting device, via the computing device a signature data record using the data and transmitting the signature data record to the external data transmitting device via the output data diode, and the computing device only uses or considers the data received if the external data transmitting device, after receiving the signature data record, reports back that the signature data record confirms correct data reception;
   creating, after receiving the request message, a modified request message containing a request using the interface and is forwarded to the input data diode, wherein the modified request message contains identification data relating to the interface; and/or
   carrying out, after receiving the request message, a check in order to determine whether the request message comes from the external data transmitting device which is authorized to transmit the data, the request message or the modified request message being transmitted to the input data diode in an event of the request message from the authorized data transmitting device and this is otherwise not carried out; and/or
   carrying out, after receiving the request message, a check in order to determine whether the request message contains control commands or executable software modules, and, if this is the case, the request message is not forwarded to the input data diode; and/or
   generating, after receiving the request message or the modified request message which has been forwarded via the input data diode and the data lock, via the computing device the response message and transmitting the response message to the external data transmitting device via the output data diode, wherein the response message directly or indirectly indicates at least one future time or time slot at which or in which the data can be transmitted to an auxiliary computing device; and/or
   generating the response message to contain a public key of the computing device and/or an address of the auxiliary computing device; and/or
   creating, after receiving the data from the external data transmitting device, via the computing device a signature data record using the data and transmitting the signature data record to the external data transmitting device via the output data diode; and/or
   buffering the request message and/or the data from the external data transmitting device in a further data memory in the input data diode or using the further data memory between the input data diode and the data lock and are only then transmitted, in a manner divided into data packets, to the computing device data packet by data packet via the data lock; and/or
   receiving, via the auxiliary computing device, the data at predefined times or in predefined time slots and forwards the data received to the computing device via the input data diode and the data lock; and/or
   checking, upon receiving the data from the external data transmitting device, via the auxiliary computing device whether the external data transmitting device is an authorized data transmitting device and/or whether the response message has been previously transmitted to the external data transmitting device, and does not forward the data to the computing device in an event of a negative checking result and forwards the data received to the computing device via the input data diode and the data lock in an event of a positive checking result; and/or carrying out at least one media change, at least one physical media change, a protocol change and/or a transport media change in the input data path; and/or counting sequences and/or transmitting signatures in order to detect errors in a transmission of the data.

* * * * *